Figure 1:
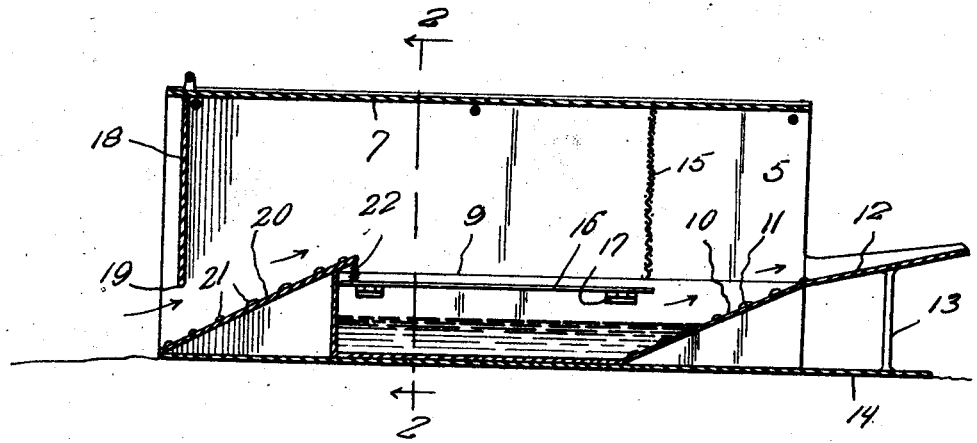

April 13, 1926.

W. H. WIKE

AUTOMATIC POULTRY DIPPER

Filed April 14, 1925

1,580,357

Inventor
W. H. Wike.

By Clarence O'Brien
Attorney

Patented Apr. 13, 1926.

1,580,357

UNITED STATES PATENT OFFICE.

WILLIAM H. WIKE, OF SYCAMORE, ILLINOIS.

AUTOMATIC POULTRY DIPPER.

Application filed April 14, 1925. Serial No. 23,010.

*To all whom it may concern:*

Be it known that I, WILLIAM H. WIKE, a citizen of the United States, residing at Sycamore, in the county of De Kalb and State of Illinois, have invented certain new and useful Improvements in Automatic Poultry Dippers, of which the following is a specification.

The present invention relates to apparatus for dipping poultry and has for its object to provide an inexpensive and efficient automatic dump, especially adapted for bathing chickens and the like in a chemical solution in order to treat certain well-known diseases which they commonly have.

Another important object is to provide an apparatus of this nature, which will be economical in the use of the chemical providing a structure which prevents the waste of the chemical through splashing, and which causes the excess chemical taken up by the poultry to be drained back into the compartment therefor provided in the apparatus.

To these ends, the invention consists in the details of construction and combination of parts more fully hereinafter disclosed and claimed.

Figure 2:
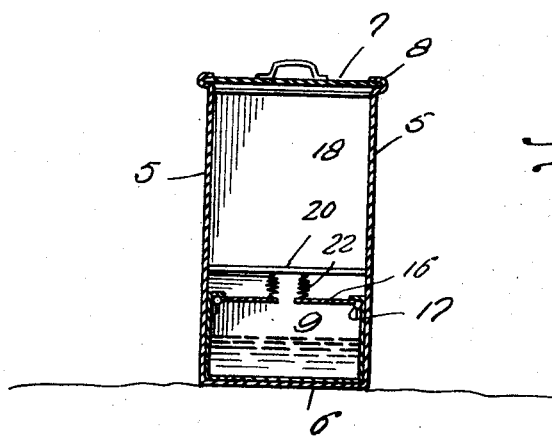

In the drawing:

Figure 1 is a longitudinal section through the apparatus embodying the features of my invention, and Figure 2 is a transverse vertical section therethrough, taken substantially on the line 2—2 of Figure 1, looking in the direction of the arrows.

Referring to the drawings in detail, it will be seen that the casing of the apparatus includes a pair of side walls 5 extending perpendicularly from the longitudinal edges of the bottom 6, and having at their upper edges the slidably mounted top 7 disposed to slide in flanges 8. A receptacle 9 is mounted on the bottom 6 and is provided with an inclined rear wall 10, having cleats 11 extending transversely thereof. A downwardly and forwardly slanting platform 12, leads from the rear wall 10 and functions as a drain pan, being supported by suitable standard 13, rising from an extension 14 at the rear end of the bottom 6. A screen 15 is disposed between the side walls 5, above the forward end of the rear wall 10 of the receptacle 9. A pair of platforms 16 are hinged, as at 17, one to each side wall of the receptable 9. The receptacle 9 is adapted to be about half filled with a suitable chemical solution.

A front wall 18 is provided between the side walls 5 and terminates a distance above the bottom 6 so as to provide an entrance 19. A slanting platform 20 extends from the bottom of the entrance 19 over the front wall of the receptable 9 and has disposed thereon a plurality of transversely extending cleats 21. Springs 22 are attached to the rear edges of the platform 20 and to the free edges of the hingedly mounted platform 16, so as to normally hold these platforms 16 in a rasied or horizontal position.

The poultry walks up the platform 20 through the entrance 19, and as soon as it steps on the platform 16, said platform 16 tilts downwardly and dumps the poultry in the chemical bath in receptacle 9. Owing to the scare of thus being dumped, the poultry will flap its wings and obtain a good bath and walk up the rear wall 10 and over the drain platform 12. The screen 15 will prevent the poultry from flying out of the bath receptable 9. The top 7 may be easily removed for cleansing the apparatus.

It is thought that the advantages and construction of this apparatus will now be clearly understood, without a more detailed description thereof.

It is evident that various changes might be resorted to, in the form, construction, and arrangement of the several parts, without departing from the spirit and scope of the invention as claimed.

Having thus described my invention, what I claim as new is:

In a dipping apparatus of the class described, a casing comprising a bottom, sides, and a top so as to form an entrance at one end and an exit at the other end, a receptacle mounted in the casing on the bottom thereof and intermediate the ends thereof, an inclined platform leading upwardly from the bottom of the entrance of the casing over the front wall of the receptacle, a pair of tiltable platforms, one hinged to each side wall of the receptacle, springs mounted on the rear end of the first platform and attached to the tiltable platform to hold said platform normally in raised position, said receptacle provided with an inclined rear wall merging into a drain platform continuing on a slant with said rear wall and outwardly through the exit, and a screen in the receptacle immediately above the rear portion of the receptacle and at a distance inwardly from the exit.

In testimony whereof I affix my signature.

WILLIAM H. WIKE.